(12) United States Patent
Hausman et al.

(10) Patent No.: US 7,533,054 B2
(45) Date of Patent: May 12, 2009

(54) CENTRAL CREDIT FILTERING IN COMPUTERIZED TRADING

(75) Inventors: Andrew Hausman, Summit, NJ (US); Karen D. Tannenbaum, New York, NY (US); Paul Brian Beatty, Jr., Garden City, NY (US); Lawrence C. Waldorf, Staten Island, NY (US); Alan Dweck, Turramurra (AU); Anish Malhotra, Middlesex (GB); Guy Mock, Tokyo (JP); Richard Anthony Lawson Braham, London (GB)

(73) Assignee: Bloomberg L.P., New York, NY (US)

( * ) Notice: Subject to any disclaimer, the term of this patent is extended or adjusted under 35 U.S.C. 154(b) by 13 days.

(21) Appl. No.: 11/048,661

(22) Filed: Jan. 31, 2005
(Under 37 CFR 1.47)

(65) Prior Publication Data

US 2006/0041498 A1 Feb. 23, 2006

Related U.S. Application Data

(63) Continuation of application No. 10/831,965, filed on Apr. 26, 2004, now abandoned, which is a continuation of application No. 10/611,652, filed on Jun. 30, 2003, now abandoned.

(51) Int. Cl.
*G06Q 40/00* (2006.01)
(52) U.S. Cl. .......................................... 705/37; 705/35
(58) Field of Classification Search .................. 705/37, 705/36, 35
See application file for complete search history.

(56) References Cited

U.S. PATENT DOCUMENTS

| 5,077,665 | A |   | 12/1991 | Silverman et al. |   |
|---|---|---|---|---|---|
| 5,136,501 | A | * | 8/1992 | Silverman et al. | 705/37 |
| 5,375,055 | A | * | 12/1994 | Togher et al. | 705/37 |
| 5,758,328 | A |   | 5/1998 | Giovannoli |   |
| 5,832,462 | A |   | 11/1998 | Midorikawa et al. |   |
| 5,842,178 | A |   | 11/1998 | Giovannoli |   |
| 5,924,082 | A |   | 7/1999 | Silverman et al. |   |
| 5,924,083 | A |   | 7/1999 | Silverman et al. |   |

(Continued)

FOREIGN PATENT DOCUMENTS

WO WO 97/22072 6/1997

(Continued)

*Primary Examiner*—James P Trammell
*Assistant Examiner*—Jamie Swartz
(74) *Attorney, Agent, or Firm*—Frank J. DeRosa; David V. Rossi; Frommer Lawrence & Haug LLP

(57) ABSTRACT

Systems, methods, and computer program products for establishing and using credit limits between counterparties and for managing risk in the trading of financial interests. Credit filtered views of executable market information are provided to trading parties. By setting credit limits used to provide credit-filtered views, a trading party may control the amount of future financial exposure that the trading party will incur with any counterparty in one or more present-and/or future time periods in trades by the trading party during a trading session. The credit limit information may be used by a central computer to provide credit filtered market views to trading parties. During a trading session, the credit remaining of a set credit limit between the trading party and the respective counterparty is changed according to trades executed between the trading party and the counterparty.

26 Claims, 8 Drawing Sheets

U.S. PATENT DOCUMENTS

| | | | |
|---|---|---|---|
| 6,014,627 A | 1/2000 | Togher et al. | |
| 6,260,025 B1 * | 7/2001 | Silverman et al. | 705/37 |
| 6,282,521 B1 | 8/2001 | Howorka et al. | |
| 6,317,727 B1 * | 11/2001 | May | 705/36 R |
| 6,343,278 B1 | 1/2002 | Jain et al. | |
| 6,347,307 B1 | 2/2002 | Sandhu et al. | |
| 6,421,653 B1 * | 7/2002 | May | 705/36 R |
| 6,519,574 B1 | 2/2003 | Wilton et al. | |
| 7,003,488 B2 * | 2/2006 | Dunne et al. | 705/37 |
| 7,143,061 B2 * | 11/2006 | Treynor | 705/36 R |
| 7,149,720 B2 * | 12/2006 | Shepherd | 705/37 |
| 2001/0037284 A1 | 11/2001 | Finkelstein et al. | |
| 2002/0082976 A1 | 6/2002 | Howorka | |
| 2002/0099647 A1 | 7/2002 | Howorka et al. | |
| 2002/0099651 A1 | 7/2002 | May | |
| 2002/0111896 A1 | 8/2002 | Ben-Levy et al. | |
| 2002/0116317 A1 | 8/2002 | May | |
| 2002/0156710 A1 * | 10/2002 | Ryder | 705/35 |
| 2002/0178104 A1 | 11/2002 | Hausman | |
| 2002/0194105 A1 * | 12/2002 | Klein | 705/37 |
| 2003/0009411 A1 * | 1/2003 | Ram et al. | |
| 2003/0200169 A1 * | 10/2003 | Freeny, Jr. | 705/37 |
| 2004/0199447 A1 * | 10/2004 | Treynor | 705/36 |
| 2006/0069635 A1 * | 3/2006 | Ram et al. | 705/37 |
| 2006/0080216 A1 | 4/2006 | Hausman et al. | |
| 2006/0259417 A1 * | 11/2006 | Marynowski et al. | 705/37 |

FOREIGN PATENT DOCUMENTS

| | | |
|---|---|---|
| WO | WO 97/45802 | 12/1997 |
| WO | WO 99/19821 | 4/1999 |
| WO | WO 00/16224 | 3/2000 |
| WO | WO 01/50776 | 7/2001 |
| WO | WO 01/16830 | 8/2001 |

* cited by examiner

|  | Customer 1 | Customer 2 | Customer 3 | Customer 4 | Customer 5 | Customer 6 |
|---|---|---|---|---|---|---|
| Customer 1 |  | $12M | $4M | $10M | $10M | $10M |
| Customer 2 | $7M |  | $12M | $11M | $11M | $11M |
| Customer 3 | $6M | 0 |  | $14M | $14M | $14M |
| Customer 4 | $8M | $9M | $8M |  |  |  |
| Customer 5 | $8M | $9M | $8M |  |  |  |
| Customer 6 | $8M | $9M | $8M |  |  |  |

Fig. 2

|  | Customer 1 | Customer 2 | Customer 3 | Customer 4, 5 & 6 |
|---|---|---|---|---|
| Customer 1 |  |  |  |  |
| Customer 2 | $7M |  |  |  |
| Customer 3 | $4M | 0 |  |  |
| Customer 4, 5 & 6 | $8M | $9M | $8M |  |

Fig. 3

| | | | | Date | < > | MY ORDERS | < > |
|---|---|---|---|---|---|---|---|
| | / | | | CADON | < > | / | < > |
| c900M | +1.645/ | +1.700 | c900M | CADSN | < > | / | < > |
| c700M | +6.70 / | +6.90 | c700M | CAD1W | < > | / | < > |
| c800M | +11.85 / | +12.25 | c800M | CAD2W | < > | / | < > |
| c700M | +17.75 / | +18.13 | c700M | CAD3W | < > | / | < > |
| c800M | +25.60 / | +26.08 | c800M | CAD1M | < > | / | < > |
| c600M | +52.40 / | +53.40 | c600M | ✓CAD2M | < > | / | < > |
| c600M | +75.70 / | +76.70 | c600M | CAD3M | < > | / | < > |
| c800M | +99.00 /+ | +100.00 | c800M | CAD4M | < > | / | < > |
| c800M | +120.50 /+ | +122.50 | c800M | CAD5M | < > | / | < > |
| c800M | +143.50 /+ | +146.00 | c800M | CAD6M | < > | / | < > |
| c800M | +201.00 /+ | +205.00 | c800M | CAD9M | < > | / | < > |
| c700M | +258.50 /+ | +263.50 | c700M | CAD1Y | < > | / | < > |
| c300M | +70.080/ | +71.050 | c300M | CADI1 | < > | / | < > |
| c200M | +138.020/+ | 139.020 | c200M | CADI2 | < > | / | < > |

11:43    Current Spot : 1.3435  /1.3439                ALERTS    Page 1/ 1

```
Credit Bucket Setup
```

| Credit Bucket | From | Up to | Tenors in chronological order |
|---|---|---|---|
| 1 | ON | ON | 1. ON    10. 4M |
| | | | 2. TN    11. 5M |
| 2 | > ON | 2W | 3. SN    12. 6M |
| | | | 4. 1W    13. 7M |
| 3 | > 2W | 2M | 5. 2W    14. 8M |
| | | | 6. 3W    15. 9M |
| 4 | > 2M | 6M | 7. 1M    16. 10M |
| | | | 8. 2M    17. 11M |
| 5 | > 6M | 9M | 9. 3M    18. 1Y |
| 6 | > 9M | 1Y | |

Please enter tenors, not numbers

Last updated

Australia 61 2 9777 8600    Brazil 5511 3048 4500    Europe 44 20 7330 7500    Germany 49 69 920410
Hong Kong 852 2977 6000  Japan 81 3 3201 8900  Singapore 65 6212 1000  U.S. 1 212 318 2000  Copyright 2003 Bloomberg L.P.
6457-363-0 25-Jun-03 16:34:18

Bloomberg
PROFESSIONAL

1<GO> to apply credit changes immediately, 2<GO> to apply the changes next day

Counterparty Credit Limit Setup
COMPANY A                                         Page    1/  29

Display Option: [O]                    Instructions for Entering Credits

| ON - ON | TN - 2W | 3W - 2M | 3M - 6M | 7M - 9M | 10M - 1Y | Maximum |
|---------|---------|---------|---------|---------|----------|---------|

ABAX BANK (MILAN)

| 0.0M | 0.0M | 0.0M | 0.0M | 0.0M | 0.0M | 0.0M |

ABN AMRO BANK N.V. (CHICAGO)

| 100.0M | 30.5M | 30.0M | 100.0M | 100.0M | 100.0M | 300.0M |
| 40.0M  | 30.0M | 30.0M | 100.0M | 100.0M | 100.0M | 300.0M |

ABN AMRO BANK TOKYO BRANCH

| 100.0M | 50.0M | 10.0M | 10.0M | 70.0M | 100.0M | 300.0M |
| 50.0M  | 50.0M | 10.0M | 10.0M | 70.0M | 100.0M | 300.0M |

AIG INTERNATIONAL, INC.

| 0.0M | 0.0M | 0.0M | 0.0M | 0.0M | 0.0M | 0.0M |

ALLIED IRISH BANKS PLC

| 0.0M | 0.0M | 0.0M | 0.0M | 0.0M | 0.0M | 0.0M |

WHITE - Trade enabled    AMBER - Your and counterparty's permission required
RED - Counterparty's permission required    GREEN - Your permission required Australia 61 2 9777 8600     Brazil 5511 3048 4500     Europe 44 20 7330 7500     Germany 49 69 920410
Hong Kong 852 2977 6000  Japan 81 3 3201 8900  Singapore 65 6212 1000  U.S. 1 212 318 2000  Copyright 2003 Bloomberg L.P.
6457-363-1 25-Jun-03 16:03:39

Bloomberg PROFESSIONAL

FIG. 8

All credit amounts are expressed in USD. M for millions, Y for billions.

| Available Credits / Credit Limits COMPANY A | | | | | | Page 1/ 29 |
|---|---|---|---|---|---|---|
| ON - ON | TN - 2U | 3U - 2M | 3M - 6M | 7M - 9M | 10M - 1Y | Maximum |
| Total of all counterparties | | | | | | |
| T UNLIMITED | 80.0M | 40.0M | 110.0M | 170.0M | 200.0M | UNLIMITED |
| R UNLIMITED | 80.0M | 40.0M | 110.0M | 170.0M | 200.0M | |
| 1) ABAX BANK (MILAN) | | | | | | |
| 0.0M | 0.0M | 0.0M | 0.0M | 0.0M | 0.0M | 0.0M |
| 0.0M | 0.0M | 0.0M | 0.0M | 0.0M | 0.0M | |
| 2) ABN AMRO BANK N.V. (CHICAGO) | | | | | | |
| 40.0M | 30.0M | 30.0M | 100.0M | 100.0M | 100.0M | 300.0M |
| 40.0M | 30.0M | 30.0M | 100.0M | 100.0M | 100.0M | |
| 3) ABN AMRO BANK TOKYO BRANCH | | | | | | |
| 50.0M | 50.0M | 10.0M | 10.0M | 70.0M | 100.0M | 300.0M |
| 50.0M | 50.0M | 10.0M | 10.0M | 70.0M | 100.0M | |
| 4) AIG INTERNATIONAL, INC. | | | | | | |
| 0.0M | 0.0M | 0.0M | 0.0M | 0.0M | 0.0M | 0.0M |
| 0.0M | 0.0M | 0.0M | 0.0M | 0.0M | 0.0M | |
| 5) ALLIED IRISH BANKS PLC | | | | | | |
| 0.0M | 0.0M | 0.0M | 0.0M | 0.0M | 0.0M | 0.0M |
| 0.0M | 0.0M | 0.0M | 0.0M | 0.0M | 0.0M | |
| T Total   R Remaining | | | | | | |

FIG. 9

CENTRAL CREDIT FILTERING IN COMPUTERIZED TRADING

CROSS REFERENCE TO RELATED APPLICATION

The present application is a continuation of application Ser. No. 10/831,965, filed Apr. 26, 2004, now abandoned, which is a continuation of application Ser. No. 10/611,652, filed Jun. 30, 2004, abandoned, the entirety of which is incorporated by reference herein.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

This application contains material relating to the trading of financial interests. The trading of some financial interests is regulated, as for example by the United States Government, the various State governments, and other governmental agencies within the United States and elsewhere. The disclosure herein is made solely in terms of logical and financial possibility and advantage, without regard to possible statutory, regulatory, or other legal considerations. Nothing herein is intended as a statement or representation of any kind that any system, method or process proposed or discussed herein does or does not comply with any legal requirement whatsoever, in any jurisdiction; nor should it be taken or construed as doing so.

FIELD OF THE INVENTION

The invention relates generally to electronic trading. More particularly, the invention relates to the establishment and use of credit limits between trading parties in electronic trading, which can assist in the management of financial exposure or risk in, such trading. A preferred embodiment of the invention relates to computerized trading of foreign exchange ("FX") involving credit advanced between parties in connection with proposed trades between the parties.

BACKGROUND OF THE INVENTION

Computerized trading of financial interests may involve the setting and use of limits on credit that trading parties are willing to extend to one another. Examples are described in the following U.S. Pat. Nos.: 5,136,501; 5,375,055; 5,832,462; 5,924,083; 6,260,025; 6,317,727; 6,343,278; and 6,421,653; in International PCT Application published under WO 00/16224; and in U.S. patent application Ser. No. 09/584,045, filed 30 May 2000, entitled ELECTRONIC TRADING SYSTEM FOR ELECTRICITY FORWARDS, the entire disclosure of which is hereby incorporated herein by reference, discloses a trading system in which two-way or bilateral enablement may be established within a plurality of forward terms in a trading system. Application Ser. No. 09/584,045 and this application are commonly owned.

SUMMARY OF THE INVENTION

The invention provides for display of credit-filtered market data in a computerized system for trading financial interests having a future financial exposure over a network. Credit information is stored, and accessed by a central to provide credit filtered market views to trading parties based on credit information between the trading party and a counterparty. Such credit information is stored in a database or databases accessible by the central computer, which performs all credit filtering for all trading parties. (A central computer may be a host computer.) Credit limits may be set, and credit filtered views provided for proposed trades in a single or plurality of presents and/or future time periods.

The invention is applicable to the trading of many types of financial interests, for execution and subsequent settlement with respect to a current trading session, and for execution and subsequent settlement in one or more present or future time periods. In a preferred embodiment, the invention has application to providing credit filtered market views for the trading of financial interests being sold at, or which mature at, or which present a financial exposure to one or more trading parties at a future time or times.

The term "trading session" is meant in a broad sense, and may encompass a single trading day, a portion of a trading day, multiple trading days, or other periods of time. The length of a trading session may be set, e.g., by an operator of the trading system, or other third party.

The invention provides for the credit-filtered display of market information based on credit limits established by trading parties. Such credit limits are useful, for example, in the trading of financial interests being sold at, or which mature at, or which present a financial exposure to one or more trading parties at a future time or times. Examples of such financial interests include foreign exchange ("FX") forwards contracts, forwards contracts in commodities, e.g., precious metals, energy, etc., stock options, futures contracts, bonds, loan contracts, money market certificates, other fixed income securities, etc.

Credit limits and available credit (credit remaining or remaining credit) amounts may be used to prescreen, or filter, proposed trades, so that only terms for proposed trades for which sufficient credit exists will be displayed to or otherwise made available to a party. Screening may alternatively be provided in a number of ways, including, for example, color coding on a computer screen display. For example, terms for proposed trades for which sufficient credit exists may be presented in a first color, terms for which partial credit exists in a second color, and terms for which no credit exists in a third color. Credit available, credit remaining and remaining credit are used interchangeably herein unless the context indicates otherwise.

Credit values, amounts and limits may be used to cap or limit the financial exposure or price terms of a proposed trade made available to potential traders, by, for example, making available to one counterparty information relating to a proposed trade of financial interests proposed by the other potential counterparty up to the value of available credit, e.g., where the information comprises a financial exposure not greater than the relevant available credit. Thus, for example, terms for a proposed trade having a financial exposure of $10M may be displayed or otherwise made available to a trading party as a proposal for trading $7M of financial exposure, where the trading party has only $7M in available credit with the counterparty proposing the trade. This is useful where trading of less than total portions of proposed trades is permitted.

Preferably, prescreening of proposed trades is provided on a dynamic basis, so that terms for a proposed trade made available to a user are changed as available credit to a counterparty or counterparties changes, if the proposed trade would be affected by an available credit charge. For example, if terms for a proposed trade are presented on a trading party's display, and the amount of available credit between the trading party and the counterparty proposing the trade changes (as increased, for example, when an administrative user replenishes or increases credit, or decreased, for example, when another individual trader of the same trading party completes a separate trade with the proposing counterparty), the price term made available to the trading party may be changed, as for example by changing a screen display in real time.

In such embodiments, where the amount of available credit is increased, as for example by revocation of a previously-accepted trade or by replenishment by one or both parties of an available credit portion, a previously hidden proposal may be revealed to a trading party, so that the opportunity for trading is reinstated Credit limits expressed in monetary terms is only one way in which the risk of a proposed transaction may be expressed. In many cases, financial exposure of a party may be reduced to a monetary value, but the reduction of such exposure to monetary value is not always convenient or desirable, or even possible. Thus, the invention is also viewed in a broader sense as providing methods of managing risk or exposure of trading parties by establishing a plurality of different time periods, for each of which a trading party can set a credit limit for trades with another trading party. Using a set credit limit for a time period in which trading parties propose a trade, the proposed trade is displayed where a financial exposure of the trade in the time period does not exceed the set credit limit. If the credit limit is exceeded, the proposed trade is not displayed. For each trade that is completed in each time period, the credit limit for the respective time period is decremented by the exposure value of the completed trade. On a time basis or trading session basis, the credit limits may be automatically reset. For example, the beginning and/or the end of each of the plurality of time periods may be selectable by a party that is enabled to set a credit limit for the respective time period.

In order to use credit limits in trading as disclosed here, a compatible relationship between financial exposure and credit limits is provided. For example, in the trading of FX forwards, the financial exposure in the forward leg involves forward points. However, there is a relationship between the size of the near leg, based on the spot rate, and the financial exposure. Therefore, in a preferred embodiment, the financial exposure for a forward leg is expressed simply as the size of the near leg trade in the same currency as that used to set credit limits. (Depending upon which currency of the currency pair that the size of the trade is expressed, a conversion may be necessary to the other currency of the pair using the spot rate.) In this embodiment, credit limits are expressed in the total size of trades between potential counterparties as one of the currencies in the pair, and the financial exposure is expressed similarly as the size of each trade between potential counterparties in the same currency.

A time period, as contemplated for use in systems and methods according to the invention, includes any time period desired or designated by the trading party or provided, as a default or otherwise, by the trading system. This includes, for example, the same trading session, a single day; a range of dates or trading sessions; or a portion of a day or trading session.

In a preferred embodiment, with respect to a current trading station and/or for each of a plurality of future time periods with respect to a trading session, a credit value designated by a trading party for trading between the trading party and at least one counterparty, financial interests having a financial exposure to the trading party in the respective future time periods is provided in a memory device accessible by a central computer. During the trading session, display is provided by a central computer to the trading party over the network of a proposed trade between the trading party and the at least one counterparty of a financial interest having a financial exposure in a future time period if the financial exposure to the trading party of the financial instrument in the future time period, expressed in terms compatible with the credit value in the memory device for the future time period, is less than the credit value in the memory device for the future time period.

In a preferred embodiment, a credit value is designated by each of a pair of potential counterparties for trading such financial interests with each other which have a financial exposure to each of the pair of counterparties in the respective future time periods. A display of the proposed trade between the pair of potential counterparties is provided over the network to at least one of the trading parties if the financial exposure to each of the potential counterparties of the financial instrument in the future time period, expressed in terms compatible with the credit value in the memory device for the future time period, is less than the lesser of the credit values provided in the memory device for each of the potential counterparties for the future time period.

In a preferred embodiment, the credit value for each time period and each counterparty is also stored as a credit available value for use during the trading session. During the trading session, the display is provided to the trading party over the network of a proposed trade between the trading party and the at least one counterparty of a financial interest having a financial exposure in a future time period if the financial exposure to the trading party of the financial instrument in the future time period, expressed in terms compatible with the available credit value in the memory device for the future time period, is less than the available credit value in the memory device for the future time period.

In a preferred embodiment, the financial interest is foreign exchange forwards contracts, and display is provided of a proposed trade between the trading party and the at least one counterparty of a foreign exchange forwards contract for a given currency pair having a forward leg in a future time period over the network if the size of the proposed trade, expressed in a currency compatible with the credit value in the memory device for the future time period, is less than the credit value in the memory device for the future time period.

The invention also provides systems and products that implement the foregoing functionality. Such a system comprises a central computer linked to a plurality of trading party stations by a network and a memory device accessible by the central computer for storing the credit information disclosed herein, and for performing the credit filtering functionality disclosed herein. Such a product comprises a computer usable medium or media storing computer readable code which when executed causes the central computer to carry out the functionality disclosed herein.

In a preferred embodiment, a system according to the invention is implemented on a central server- or central host-client system, in which central data storage and processing of a credit and trading data is provided. In such a system, credit limit data, including preferably the trading party, counterparty, and time periods associated with each credit limit, are stored in a memory device accessible by a central server or host computer.

BRIEF DESCRIPTION OF THE DRAWINGS

The figures of the accompanying drawings are meant to be exemplary and not limiting, in which like references are intended to refer to like or corresponding parts, and in which:

FIG. 2 is a diagram illustrating storage of credit limits that each one of pairs of trading parties have assigned to the other one of the pairs;

FIG. 3 is a diagram illustrating storage of the lower of the two credits limits assigned between pairs of trading parties;

FIG. 8 is an exemplary screen display suitable for use as a user interface to set credit limits in tenors for trading FX forwards with respect to named potential counterparties in accordance with an embodiment of the invention; and FIG. 9 is an exemplary screen display suitable for use as a user interface to view credit limits and available credit in tenors for trading FX forwards with respect to named potential counterparties in accordance with an embodiment of the invention.

DETAILED DESCRIPTION

Figure 1:
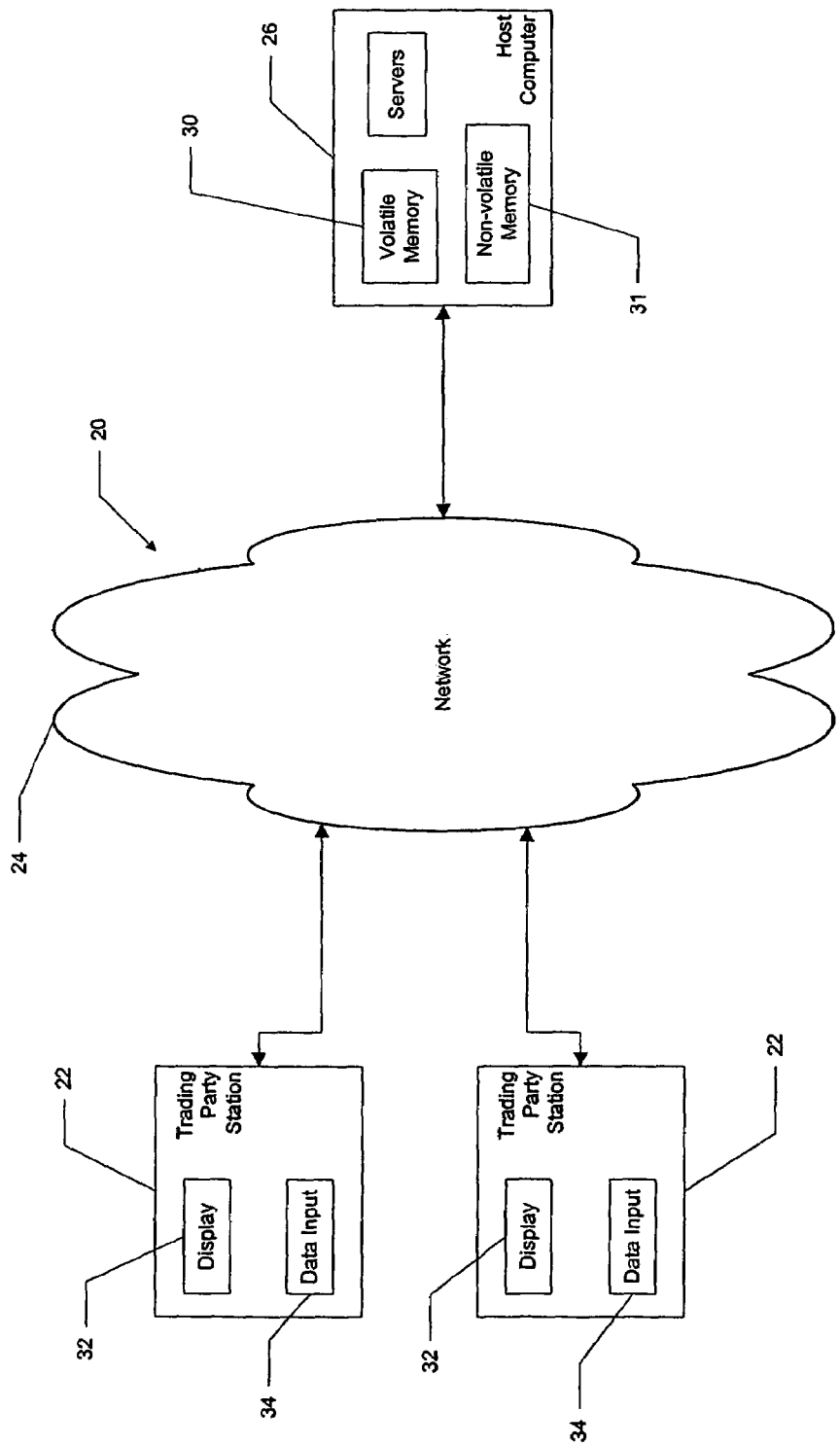
FIG. 1 is a diagram of an exemplary computer network system suitable for use in implementing methods of trading financial interests according to a preferred embodiment of the invention.

FIG. 1 depicts a system 20 configured as an electronic trading platform for computerized trading of financial interests. In a preferred embodiment, system 20 is configured for the computerized trading of FX, in spot, forwards and swap. However, in other embodiments disclosed herein and/or evident to those of skill in the relevant arts from the disclosure herein, system 20 may be configured to trade other financial interests involving credit.

System 20 according to an embodiment of the invention includes trading party stations 22 linked to a central computer 26, configured as a host computer, by a communications and/or computer network 24. Host computer 26 performs various tasks and functions of the system 20, including credit-related and trading functions. The host computer 26 may be connected in a LAN (not shown) to operate with databases and/or other computers as described, for example, in U.S. patent application Ser. No. 09/584,045 mentioned above.

Although the plurality of trading party stations 22 are shown in FIG. 1 as having respective direct connections to network 24, there may alternatively be more or fewer connections between trading party stations 22 and network 24. For example, pluralities of trading party stations 22 may be connected to network 20 singly or in groups via LANs or WANs, and/or by private Electronic Communication Networks (ECNs) or public networks such as the Internet. Trading party stations 22 may represent a single station of a trading party, or a plurality of trading party stations of the trading party. Trading party stations 22 and host computer 26 preferably operate in a client/server architecture, with the trading party stations 22 providing respective users with access to host computer 26. Depending upon context, a "trading party" may be an individual, an individual in a firm, or a firm. A firm may be a bank, a brokerage or trading firm, etc. The term "user" is meant broadly and encompasses a person who is operating a trading party station on behalf of a trading party, e.g., on behalf of him or herself or on behalf of a firm.

In a preferred embodiment of the invention, a plurality of trading party stations 22 may be connected in a LAN of a firm such as a commercial or investment bank. Within such a firm, a trading party station 22 may be employed for use by a trading party administrator or administrative user, for example, to set credit limits for each of the other trading party stations 22 with which the firm wishes to consider trading. Such a trading party station 22 is referred to herein as a trading party administrative station. Trading party stations 22 that may trade with each other may be referred to as counter-party stations.

Trading party stations 22 may comprise any suitable computer or computer system, including, for example, desktops, laptops, personal digital assistants (PDAs), local servers, or other computers or data processors, at least one display 32, such as a computer monitor or other output device, and data input 34 such as, for example, a keyboard, and a mouse, touch pad or screen, or other selection or pointing device.

The network 24 may comprise a closed network (including, e.g., a router network) and/or the Internet. Gateway directors, gateways, firewalls, etc. (not shown) link the host computer 26 to the network 24.

Host computer 26 may have one or more CPUs, and have and/or have access to volatile memory 30 and non-volatile memory 31, which can be shared by various functions of host computer 26. Memories 30 and 31 can store databases and software for processing credit functionality and trading functionality, and host computer 26 may manage data storage and retrieval with respect to memories 30 and 31, and other memories which host computer can access, e.g., directly and/or on a network such as a LAN or other network.

The host computer 26 may implement in software an interface server which interprets data and command inputs from trading party station 22 and controls display of screens on trading party displays 32. Host computer 26 may also implement in software one or more task servers that process credit and trading tasks or functions, and store and process data related to the credit and trading tasks.

In a preferred embodiment, all processing for the system 20 relevant to the invention disclosed herein is performed by the host computer 26, and trading party stations 22 include client software that interacts with the host computer to allow users to receive and view data from, and input and transmit data to, the host computer 26. Each copy of the client software and/or each trading party station may be provided with unique information to uniquely identify each copy of the client software and/or each trading party station 22. Host computer 26 may be implemented in any suitable single, and preferably multi-processor, commercially available computer, e.g., those of Data General Division of EMC Corp. In a preferred embodiment, where the host computer includes multiple processors, credit data is preferably stored in space of volatile memory 30 shared by all processors. Also, in a preferred embodiment, all trading and credit functionality performed by host computer 26 is preferably under control of a single operating system.

A database stored in non-volatile memory 31 contains a record for each unique trading party station 22 (or copy of client software) authorized to trade using system 20. Where a trading party comprises a firm and a plurality of trading party stations, a record is stored in memory 31 preferably for each trading party station in the firm. Each record may contain profile information including unique customer information (referred to herein as "customer number") corresponding to the unique information for the copy of the client software or trading party station, unique firm information (referred to herein as "firm number") identifying the firm of which the trading party station is a part, and credit information specifying a credit limit, e.g., in dollars or other currency, that a trading party (or firm) has extended to other trading parties (or firms) for each currency pair to be traded, e.g., U.S. Dollars/ Euros, U.S. Dollars/Australian Dollars, U.S. Dollars/Japanese Yen, etc., for each tenor (or future time period), and the amount of credit currently used for a trading day. Each customer number is unique for each trading party station (or copy of client software) and corresponds to a specific trading party station (or copy of client software). The firm number is unique for each firm, but is identical for each record corresponding to trading party stations of the same firm.

Credit information may be set and tracked at the customer number level, so that the credit information may be unique for each customer number, even where the customer numbers correspond to multiple trading party stations or copies of client software in the same firm. Host computer 26 may track firm credit information by setting all credit information relevant to the firm corresponding to a trading party station, involving a change in credit information to all other trading party stations of the firm. Alternatively, credit information may be set and tracked at the firm level such that, where a firm uses multiple trading party stations, the credit information for all records corresponding to the firm will be set the same by setting firm credit information. The databases for system 20 store order and trade information for each customer number and firm number.

Volatile working memory 30 is the memory space where the host computer 26 processes data for trading and credit functions. At certain times, such as at startup, the host computer 26 loads the records from the databases in non-volatile memory 31 into volatile working memory 30. Also, the host computer 26 reloads records into or updates records in volatile working memory 30 whenever those records are updated.

In a preferred embodiment, credit information for all trading party stations (or copy of client software) is maintained in non-volatile memory 31, e.g., in a matrix structure such as shown in FIG. 2, where all customer numbers, which correspond to trading party stations (or copy of client software) are represented along the rows of the matrix and also along the columns of the matrix so that the amount of credit extended by each customer number to every other customer number is contained in a cell of the matrix. In a preferred embodiment, a matrix is provided for all currencies being traded, so that credit limits apply to trades cumulatively regardless of the particular currency pairs traded. In another embodiment, a credit matrix may be provided for each currency pair, and credit may be tracked for each currency pair rather than cumulatively.

Referring to the credit matrix of FIG. 2: customer number 1 extended $12M in credit to customer number 2 for a particular tenor, and customer number 2 extended $7M in credit to customer number 1 in that tenor; and customer number 3 extended zero credit to customer number 2, who extended $12M in credit to customer number 2. One customer number setting zero credit for another customer number in the tenor has the effect of blocking trading in that tenor between the two customer numbers. Each customer number sets a credit-limit for each other customer number, which may be referred to as two-way credit between parties or bilateral credit. Customer numbers 4, 5 and 6 are from the same firm and, therefore, have the same credit limits. The shaded areas are blank because a customer number does not extend credit to trade with itself and, in this embodiment, firms do not extend credit to trade within themselves, as represented by the shaded areas at the intersections of customer numbers 4, 5 and 6. The blanks in the matrix cells for customer numbers 4, 5 and 6 with respect to each other represent zero credit as customer numbers 4, 5 and 6 cannot be trade with each other. (In other embodiments, trading party stations within a same firm, e.g., in a different branch or in a different country, may be enabled to trade with each other and would have bilateral credit settings.)

Since all transactions performed by host computer 26 involve the exchange of one currency for another, the lower bilateral credit amount extended between parties controls. For example, referring to FIG. 2, where the amount of available credit extended by customer number 1 to customer number 2 is $12 million and the amount of available credit extended by customer number 2 to customer number 1 is $7 million, then a transaction between these customer numbers will be possible only if the financial exposure of the transaction is less than or equal to $7 million. (Financial exposure for FX forwards is discussed herein.) Since only the lower amount of credit between any two customer numbers need be used, credit information related to all customer numbers is maintained in volatile working memory 30 in a half-matrix structure, i.e., a triangular matrix, e.g., as shown in FIG. 3. A half-matrix is stored in volatile working memory 30 for each tenor and for each potential counterparty of the party setting the credit limits (and in one embodiment, for each currency pair being traded).

Where customers (trading party stations) are part of the same firm, e.g., customer numbers 4-6 in the full credit matrix of FIG. 2, and a single fire-wide limit applies, each of the cells is the same for customer numbers 4-6. However, only one record need be stored in the half matrix in volatile memory 30 (FIG. 3) for customer numbers 4-6. Programming may link the records for customer numbers 4-6 so that for any change in any credit cell of any of customers 4-6 in the full matrix of FIG. 2, the corresponding cell of the other customer numbers of customer numbers 4-6 are also changed in the full matrix. The appropriate cell in the half matrix of FIG. 3 is updated accordingly. Similarly, programming preferably provides for setting and updating credit cells of customer numbers 4-6 as a firm, i.e., setting or updating firm credit information is applied against customer numbers 4-6.

As discussed above, a compatible relationship between financial exposure and credit limits is provided. For example, in the trading of FX forwards, the financial exposure in the forward leg involves forward points. However, there is a relationship between the size of the near leg, based on the spot rate, and the financial exposure. Therefore, in a preferred embodiment, the financial exposure for a forward leg is expressed simply as the size of the near leg trade in the same currency as that used to set credit limits. (Depending upon which currency of the currency pair that the size of the trade is expressed, a conversion may be necessary to the other currency of the pair using the spot rate.) In this embodiment, credit limits are expressed in the total size of trades between potential counterparties as one of the currencies in the pair, and the financial exposure is expressed similarly as the size of each trade between potential counterparties in the same currency.

The credit matrix depicted in FIG. 2 does not include numbers representing remaining credit available to customer numbers after trading has started. A third number may be stored in each cell to indicate remaining credit. Such a number may be the total size of trades between a respective pair of customer numbers for the particular trading session. Remaining credit is the difference from the credit limit and the total size of the trades. Alternatively, remaining credit may be set to the credit limit at the start of a trading session, and the size of each trade deducted from the remaining credit amount. Similarly, there is only one amount in each cell of the half matrix credit database (FIG. 2) stored in volatile memory. Rather than storing the credit limit and another number representing remaining credit in each cell of the half matrix database, as discussed above for the full matrix credit database stored in non-volatile memory, the only amount stored in the cells of the half matrix database may be the remaining credit amount, which preferably is updated from the full matrix credit database stored in non-volatile credit memory 31 or alternatively, each trade amount is deducted from the remaining credit size between the two parties involved in the trade.

The host computer 26 uses the credit matrix represented by FIG. 3 that is loaded into working volatile memory 30 to provide credit filtered views or displays as disclosed herein.

The host computer 26 handles the following functions, preferably via server functions in software: posting of orders, monitoring and handling trading activities, retrieval of detailed order and trade information, requests to download trade and order blotters, and control of information to a backend system that handles the settlement of the executed trades. However, the discussion below focuses on the credit activities and trading relevant to the invention.

Figure 4:
FIG. 4 is an exemplary screen display suitable for use as a user interface from which orders may be entered for trades and trades conducted in FX forwards in accordance with an embodiment of the invention.

All user input/output FX trading activity is performed through the user interface trading screen depicted in FIG. 4 displayed on display 32 of trading party stations 22, as provided by the host computer 26. A currency pair may be selected, e.g., from a drop-down menu in response to selection of "Markets" on screens provided by host computer 26 that have a task bar with the "Markets" selection, e.g., at the top left of the screen depicted in FIG. 4. The trading screen depicted in FIG. 4 is displayed in response to selection of e.g., "Trade CAD," in such a drop down menu selected from a screen similar to FIG. 4, but for another currency, or from another screen. Host computer 26 provides market data, received from an external ticker plant (not shown), to the trading party stations 22. via a trading screen such as the one depicted in FIG. 4.

In one embodiment, host computer 26 provides to the display 32 of a trading party station 22 a trading screen with a credit-filtered market view of bids and offers for the selected currency pair that the user of the trading party station is enabled to make, e.g., the screen depicted in FIG. 4. As discussed below, credit information is used by host computer 26 to provide a credit-filtered view or a color-coded credit-filtered view, which shows selectable orders for which sufficient and insufficient credit exists in different colors. Where color-coded filtered orders may be executed on, a credit checking procedure is used during an attempted trade, e.g., a user at a trading party station 22 may hit or lift a visible color-coded bid or offer, and thereafter, host computer 26 determines if there is sufficient credit for the proposed trade.

The center of the trading screen depicted in FIG. 4 also shows a list of tenors ("ON," "SN," "1W," etc.) each following "CAD," which designates the Canadian Dollar as one currency of the pair ("USD" (U.S. Dollars) is the other currency.) For each forward date of a tenor, the last best bid or offer for that date is shown, in this credit filtered embodiment, if the size of the potential trade is less than or equal to the current amount of credit available between the user and the party that made the last best bid or offer. During creation of the trading screen, the last best bid or offer is obtained for each forward date that may be the subject of a trade. The half-matrix credit database (FIG. 3) stored in volatile working memory that contains credit information for all trading party stations, as described above, is consulted to obtain the current amount of credit available, between the viewing trading party station and the potential counterparty party that made the last best bid or offer. If the size of the potential trade is less than or equal to this credit amount, then the potential counterparty's last best bid or offer is displayed. Otherwise, it is not displayed.

Referring to FIG. 4, a book of terms for proposed trades pending in the market is shown on the left half of the screen, which comprises, in two halves, a bid (or buy) portion on the left and an offer (or sell) portion on the right. One line is provided for each tenor, with the best proposed trades available to the trading party to whom the screen is presented shown on the line adjacent the corresponding tenor. For example, the terms for the best bid for Canadian dollars, expressed in US dollars, available to the trading party to whom the screen of FIG. 4 is displayed for the 3 week forward tenor is 700 million CAD at +0.001775 forward points for the forward leg, relative to the current spot price of 1.3435 (or the mid-point of the bid and offer spots of 1.3435 and 1.3439) shown at the top of the screen. The best offer available in the same tenor is for 700 million CAD at +0.001813 forwards points relative to spot. In a preferred embodiment, market depth can be viewed by selecting the appropriate tenor in "Date" column 601, upon which additional data lines are shown, with other bids/offers, if available, being displayed. The right half of the screen of FIG. 4 displays terms for a trading party station's own proposed trades. (None are shown in the screen depicted in FIG. 4).

Because the system is an anonymous trading system, the identities of the potential counterparties behind displayed orders, and the identity of a trading party hitting a bid or lifting an offer, are not revealed in the trading screen depicted in FIG. 4 and are not otherwise disclosed to other trading parties. Credit limits and remaining credits of trading parties also are not disclosed to other parties.

Orders can be placed in a number of ways. A user can hit or lift the last best (anonymous) bid or offer for a particular forward date. Alternatively, through activation of pop-up screens (not shown), a user can post entirely new bids and offers. Users can also use the trading screen depicted in FIG. 4 to adjust his or her bids or offers, e.g., by increasing or decreasing the price. The host computer 26 stores the data for the orders in the databases in the volatile working memory 30 and the non-volatile memory 31. Hitting or lifting a bid or offer causes a pop-up screen (not shown) to be displayed on display 32 in which a user is asked to confirm the trade. If the user confirms, then the host computer 26 executes the trade and stores the data for the trade in the database in non-volatile memory 31 and updates the database in the volatile working memory 30 to change the current amount of credit available for the customer numbers corresponding to the size of the executed trade. The host computer 26 also sends the data for the executed trade to a backend server.

The host computer 26 provides an order blotter (not shown), selected from the drop down menu when "Markets" is activated, and history that displays the status of all orders placed using the trading screen. In response to a request from a user for order history, the host computer 26 validates the user and then, if the user has the requisite access privileges, retrieves a list of orders from the stored database for the customer number designated by the user and causes the list to be displayed on the requesting trading party station.

The host computer 26 provides a trade blotter, also selected from the drop down menu when the "Markets" item, discussed above, is activated, and history that displays all of the executed orders placed using the trading screen. In response to a request from a trading party station, the host computer 26 validates the user and then, if the user has the requisite access privileges, retrieves a list of executed trades from the stored database for the customer number designated by the user and causes the list to be displayed on the requesting trading party station.

The host computer 26 controls setup and administration functions that set up access privileges for trading parties and counterparties from information entered by users at trading party stations 22. The host computer 26 uses this information to populate and or update profile information for each user in the appropriate records of the stored databases.

Credit limits may be set by the trading party administrative stations 22 corresponding to one or more tenors associated with FX orders that a trading party wishes to trade. Each trading firm that wishes to trade with other firms sets credit limits for each tenor it wishes to consider trading with other firms. A pair of firms setting credit limits with each other results in the setting of bilateral credit limits, as the matrixes depicted in FIGS. 2 and 3 show for a single tenor.

To set the multiple credit limits, a trading party administrative user (or other authorized user) enters into the trading party station 22 with respect to each potential counterparty and each tenor it is interested in trading, a credit limit associated with that counterparty and tenor. Host computer 26 processes such data, preferably stores it for archival and further processing purposes, and provides credit and trading data to trading party stations 22, as herein described.

In preferred embodiments of the invention, host computer 26 provides centralized, secure memory storage and data processing, and protects the confidentiality of sensitive credit and trading data. Suitable secure data storage and processing processes and systems are known in the art and include gateways, firewalls, and other systems.

In a preferred embodiment, host computer 26 is controlled and operated by a third party, e.g., Bloomberg LP. Similarly, in other embodiments, any regional computer may be controlled and operated by a third (or other) party.

FIGS. 4-9 depict exemplary screen displays displayed on displays 32 of trading party stations 22 suitable for use as user interfaces for implementing preferred embodiments of the invention. The screens have been developed as interfaces for the proprietary BLOOMBERG POWERMATCH® FX (hereinafter "POWERMATCH FX") system for trading FX spot, forwards and swaps, and potentially other financial interests, implemented by Bloomberg LP of New York, N.Y. The POWERMATCH FX system features described herein are compatible with implementation on a client-server network system such as that shown in FIG. 1, with trading party stations 22 providing appropriate user interfaces and data provided by the POWERMATCH FX system. Embodiments of systems, methods, and programming for counterparty credit and financial exposure and risk management in electronic trading according to the invention may be implemented for many types of financial interests in addition to FX, as pointed out above.

Figure 5:
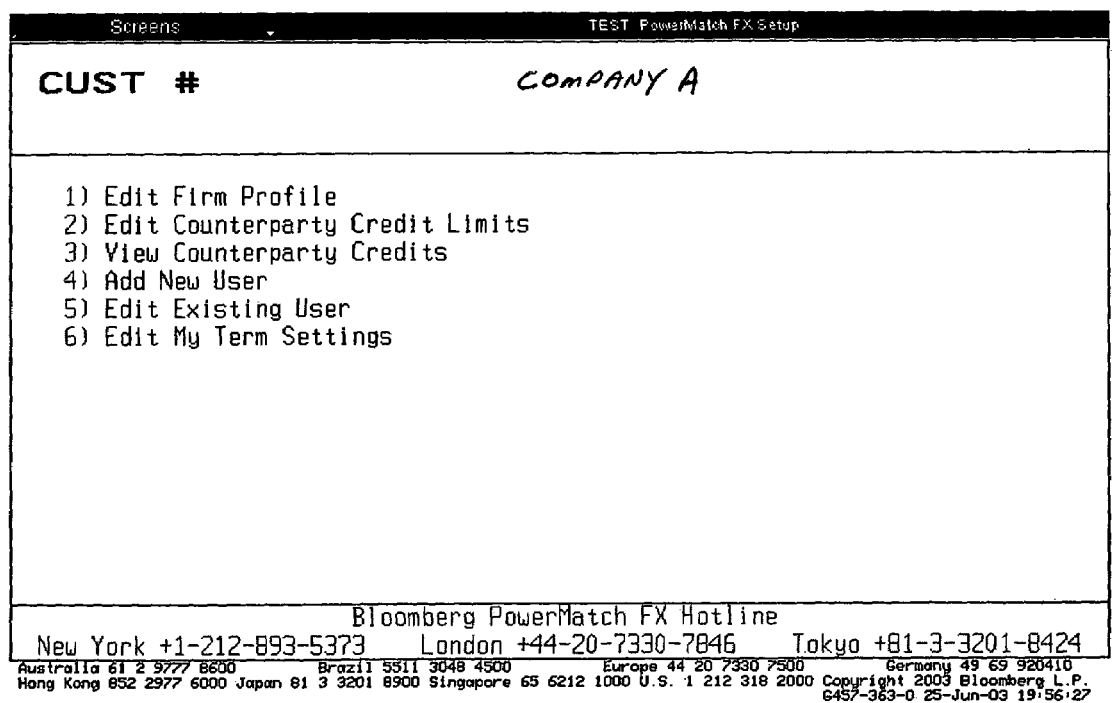
FIG. 5 is an exemplary screen display suitable for use as a user interface to select counterparty credit functions.

FIG. 5 depicts an interactive menu screen presented on a display 32 at a trading party station 22 for an administrative user authorized to set and modify trading party credit limits and control other credit, trading, and other parameters on behalf of a trading party. A user may select any of tasks 1)-6) using a mouse ("point and click" operation) or keyboard (enter task number and "enter" (or <GO> on a BLOOMBERG PROFESSIONAL® service proprietary keyboard)) connected to the trading party station 22. For example, selecting item 1 will cause a user interface screen (not shown) that has input fields for supplying and editing firm profile information to be displayed on display 32.

Administrative users of the trading parties are enabled to set a plurality of credit limits to be extended toward designated trading parties (i.e., counterparties) during one or more tenors selected or designated by the parties. For example, such administrative users are provided with screens having input fields to allow the administrative users to designate one or more credit limits to be extended toward each of a plurality of counterparties during a single trading day, or portion thereof, future time periods of overnight, days, weeks, months and years designated by the administrative user or selectable from a set of time periods provided by the system. The system may offer a set of credit limit defaults for such periods, which may be overridden, supplemented, or otherwise altered by an administrative user or selectable from a set time period by the system. The credit limits set for various time periods may be arbitrary and independent of each other, and a full set of default limits need not be utilized. An overall aggregate credit limit, not to be exceeded regardless of limits set for some or all tenors, may also be set for a trading session independently of the individual credit limits.

Counterparties need not set identical credit limits for each other, the periods in which such counterparties set limits need not be the same, and credit limits need not be set for all time periods or the "aggregate" time period. In a preferred embodiment, trading party administrative users may be provided the option of designating or setting the time periods associated with the various credit limits. In other embodiments, other options may be provided, such as setting different credit limits for selected currency pairs, and setting different tenors for selected currency pairs. For example, a given trading party may be enabled to designate one set of tenors and associated credit limits for trading US dollars and euros with one set of counterparties, and another, different set of tenors and credit limits for trading US dollars and yen with the same or other sets of counterparties.

The menu screen in FIG. 5 lists the following menu items: "Edit Firm Profile"; "Enter Counterparty Credit Limits"; "View Counterparty Credits"; "Add New User"; "Edit Existing User"; and "Edit My Term Settings." Selection of the "Edit Firm Profile," "Add New User," and "Edit Existing User" items results in the presentation, on the display of a trading party administrative station, of screens (not shown) for the input, review, and modification of administrative data.

For example, selection of the "Edit Firm Profile" item results in display (on display 32 of a trading party administrative station 22) of "firm setup" user interface screen into which a trading party administrative user may enter (or edit) information relating to the trading party, e.g., the name and contact information (e.g., telephone and fax numbers and email address) of a contact person for the trading party.

Selection of the "Add New User" item in the menu screen of FIG. 5 causes a user interface screen (not shown) to be displayed at a trading party administrative station into which a trading party administrative user may enter data relating, for example, to individuals authorized to trade on the trading party's account, such as traders employed by a bank or other institutional investment firm. Information relating to such users can include, for example, the user's name, user's address, identification number, telephone, e-mail, and other contact information. Such a user interface screen may also include data input fields for entering flags or other appropriate data for granting privileges or entitlements, or implementing controls for individual users. For example, the screen may comprise data fields for enabling the trading party administrative user to set flags granting a lower or higher level of functional access by a user, or to control the extent to which the user is able to commit the trading party financially by trading, or levels of supervisory review or authority required by or granted to the user for taking certain actions. For example, flags may be set to enable the individual user to perform only accounting or administrative tasks, to trade, to use a subset or all of trading functions, to set or reset or replenish credit limits, to train in the use of or test functions, to confirm executed or proposed trades, to access, change, or control user and or individual user data, etc.

Selection of the "Edit Existing User" function in the menu screen of FIG. 5 causes a user interface screen (not shown) to be displayed at a trading party administrative station that presents the names of specific users. Selection of a specific user from this screen will cause a user interface screen (not shown) to be displayed that presents the information related to that user previously entered by the trading party administrative user. From this screen, a trading party administrative user may modify previously entered information (and enter new information) relating to a specific user such as the information described above.

Selection of the "Edit My Term Settings" item in the menu screen of FIG. 5 allows navigation to a screen (not shown) for each currency pair and tenor into which a trading party administrative user can enter or select values for various terms that would automatically appear in that trading party's order or control increments of changes in order terms, etc.

Selection of the "Enter Counterparty Credit Limits," and "View Counterparty Credits" from the menu screen of FIG. 5 results in the presentation of user interface screens, for example, shown in FIGS. 8 and 9, into which a trading party administrative user may enter data for setting, modifying and viewing credit limits, which will be discussed below.

Figure 6:
FIG. 6 is an exemplary screen display suitable for use as a user interface to set the start and end of tenor time periods for FX forwards in accordance with an embodiment of the invention.

The menu screen of FIG. 5 may be used to select or navigate to a "Credit Bucket Setup" user interface screen, such as the one depicted in FIG. 6, into which a trading party administrative user may set or select the parameters of tenors in which the trading party is willing to trade with potential counterparties for all currency pairs. For example, the screen depicted in FIG. 6 may be displayed through the following navigation: selection of the "Edit Firm Profile" item from the menu screen of FIG. 5 at a trading party administrative station causes the firm setup user interface screen (not shown) to be displayed, which has a link to a user interface screen depicted in FIG. 6. In one embodiment, the "Credit Bucket Setup" screen is used to set tenor parameters for all counterparties in all currency pairs. The screen depicted in FIG. 6 represents this embodiment. In another embodiment, a "Credit Bucket Setup" screen, similar to the one depicted in FIG. 6, may be provided for each counterparty and/or for each currency pair.

In the embodiment represented by the screen depicted in FIG. 6, parameters for up to six tenors may be selected (for all counterparties). The trading party that is entering the tenor parameters in this exemplary screen is identified as Company A. Start and end dates relative to a daily trading session, are listed on the right side of the screen depicted in FIG. 6. In this embodiment, 18 pre-set, relative dates are provided by the system for selection by trading party administrative users to set relative start/end dates for up to six buckets provided by the system. In other embodiments, more or less buckets may be provided by the system, or the number of buckets may be made user selectable. Similarly, more or less relative start/end dates may be provided by the system, or start/end dates may be designated by the administrative user (as opposed to selecting from a set of dates). In the embodiment represented by the screen depicted in FIG. 6, relative start/end dates of ON (overnight), TN (tomorrow next), SN (spot next), and weeks (1W, 2W, etc.), months (1M, 2M, etc.) and years (1Y). Tenor relative start/end dates in the embodiment represented by the "Credit Bucket Setup" screen depicted in FIG. 6 may be set for a trading party with respect to all counterparties as follows.

Referring to FIG. 6, one of the end dates listed on the right side of the start date of the first tenor is system set to SN. Entering ON in the highlighted field for Credit Bucket 1 sets the end date of the first bucket to overnight and automatically sets start date of Credit Bucket 2 to ON. Entering 2W into the highlighted field for Credit Bucket 2 sets the end date of the second credit bucket to two weeks and the start date of Credit Bucket 3 to two weeks, etc. In this embodiment, there are no gaps between credit buckets, but other embodiments may allow such gaps. For example, in another embodiment, start dates may be entered in or selected for the "From" column, where the start date of a subsequent bucket need not be the end date of the previous bucket.

Figure 7:
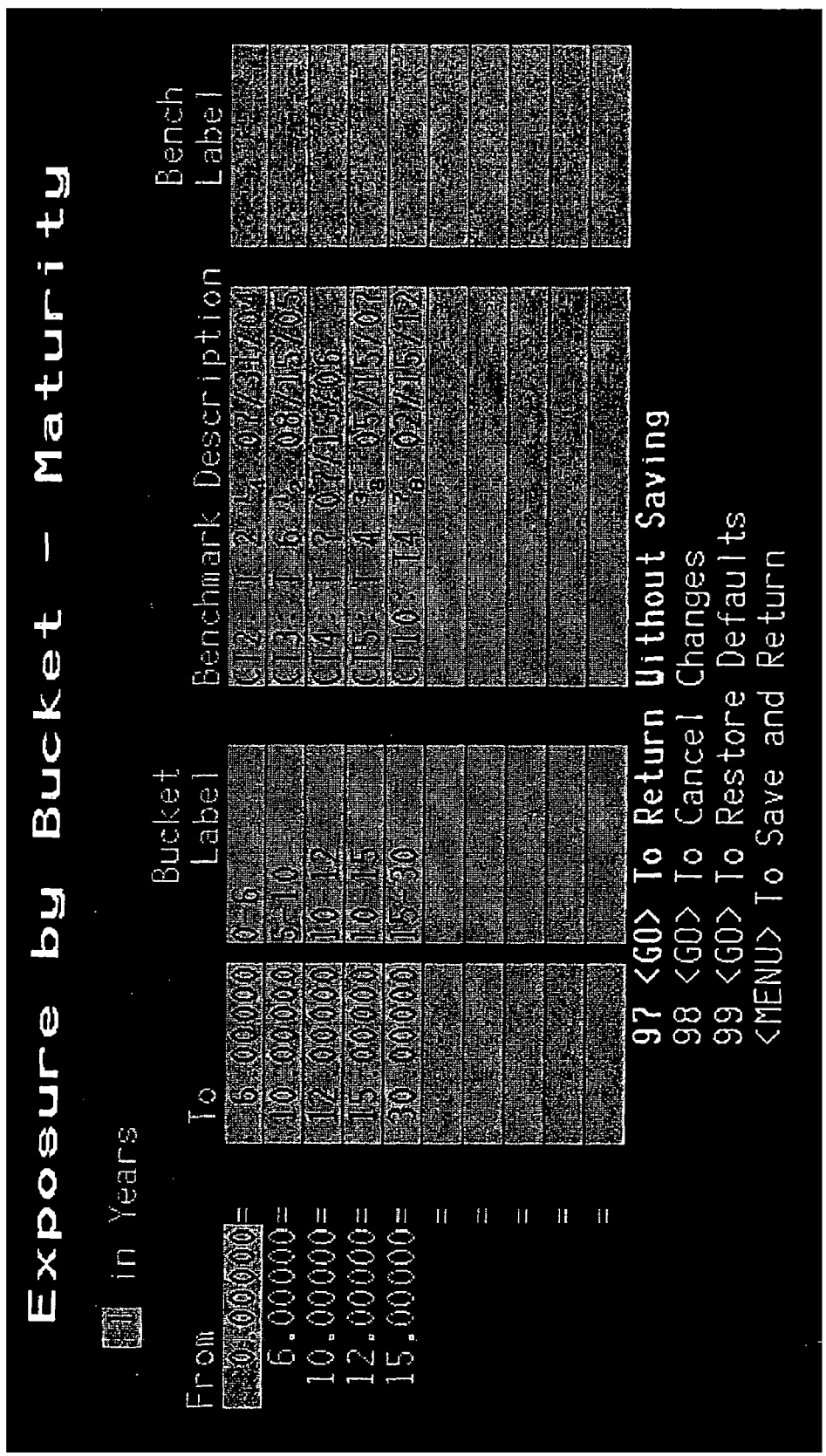
FIG. 7 is an exemplary screen display suitable for use as a user interface to set the start and end of future time periods for trading bonds in accordance with an embodiment of the invention.

FIG. 7 depicts an exemplary user interface screen for entering credit bucket parameters in a system for trading bonds. In such an embodiment, the system 20 depicted in FIG. 1 is configured for trading bonds. The "From" and "To" columns of data fields presented in the screen of FIG. 7 may be used to designate time periods, e.g., of year ranges, to be associated with credit limits to be used in trading selected sets of bonds. The year ranges represent ranges of dates, measured from the date of trading, upon which bonds traded within the designated time periods are scheduled to mature. The data field at the upper left of the screen indicates the time periods represented by the numbers in the "From" and "To" columns. The number entered by a trading party administrative user into the highlighted portion of this field sets the time period. For example, entering "1" into the highlighted portion sets the period to "in Years". Entry of other values sets time periods in months, weeks, and/or days. Other time units may also be provided.

In the embodiment represented by the screen depicted in FIG. 7, the trading party administrative user has designated time periods, or "buckets," suitable for the trading of bonds with maturities of 0-6 years; 6-10 years; 10-12 years; 12-15 years; and 15-30 years. However, any desired periods may be designated (here, stated in years as a result of user selection) for which the trading party associated with the user wishes to track the trading of the bonds, and thus to monitor the trading party's exposure in order to manage the levels of risk the trading party will incur in any one given trading session in the specified date ranges. In the "From" column of the screen depicted in FIG. 7, a trading party administrative user has designated that the first time period, or "bucket," will include maturity dates running from the date of the then current trading session to a date selected by appropriate entry in the "To" column of 6.00000 years from the then current trading session. (As in the embodiment represented by the screen of FIG. 6, the dates are-relative to a trading session.) Partial years may be entered in decimal format of up to five decimal places, so that periods of significantly less than a year's duration may be designated. Upon entry of the initial "6.00000" end date for the first bucket, the "6.00000" start date for the next bucket is automatically set and displayed in the next succeeding row in the "From" column. The user may then enter dates to establish time periods consisting of up to 9 additional date ranges, five of which are shown as already designated in FIG. 7.

Character strings, or tags, for use in identifying the various time periods for which credit limits are to be set may be entered into the "Bucket Label" column of FIG. 7. In the screen depicted in FIG. 7, labels "0-6"; "6-10"; "10-12"; "12-15"; "15-30" have been designated. In the bond trading example represented in FIG. 7, the user is also enabled to designate descriptions for benchmarks to be used in establishing bond prices, in this case treasury bonds of various maturities and interest rates. Input capabilities are also provided for entering "Bench Label" identifiers for the benchmark bonds, to be used in assessing prices and values of bonds offered in the corresponding designated time periods. Identifiers for the time periods, benchmarks, and other items are associated by the host computer 26 with the items they identify and are stored in memory 31.

In the embodiments represented by the screens of FIGS. 6 and 7, time periods may be logically associated with one another, so that a credit limit applied to one time period applies to the other, and/or so that credit drawn against one limit will be drawn against another. One embodiment of such logically-associated time periods is an aggregate or cap time period, or bucket discussed below (designated "Maximum in FIGS. 8 and 9). Aggregate credit or cap limits may be associated with, for example, all time periods set by a trading party for all (or a given set of) potential counterparties, to act as caps on one or more classes of credit to be extended or assumed with such counterparties during a given trading session.

Selection of the "Enter Counterparty Credit Limits" item in the menu screen of FIG. 5 results in the display at a trading party administrative station 22 of a user interface screen such as the "Counterparty Credit Limit Setup" screen that is shown in FIG. 8. Credit limits to be extended by Company A to various counterparties for a given trading session (and for subsequent trading sessions until changed) for the trading of FX forwards of different tenors, may be entered into the "Counterparty Credit Limit Setup" screen depicted in FIG. 8. In the embodiment represented by FIG. 8, credit limits with potential counterparties are set for all currency pairs. In another embodiment, a trading party may be permitted or required to associate credit limits on a currency pair-by-currency pair basis.

The top of the "Counterparty Credit Limit Setup" screen depicted in FIG. 8 shows the values for the six buckets or tenors whose start/end dates were set using the "Credit Bucket Setup" screen depicted in FIG. 6. The start of each tenor after the first at the top of the FIG. 8 screen is advanced from the start of the corresponding tenor shown in the FIG. 6 screen. For example, the start of bucket 3 in the FIG. 8 screen is advanced by one week to 3W as compared to 2W in the FIG. 6 screen so that there is no apparent overlap. The FIG. 8 screen shows an additional bucket designated "Maximum," which is the aggregate or cap bucket referred to above, which functions as a cap credit limit for all trades with a counterparty during the concerned trading session.

The credit limits for "Company A" in the screen depicted in FIG. 8 may be used by an administrative user to set credit limits for trading FX forwards associated with the designated time period with potential counterparties ABAX BANK (MILAN), ABN AMRO Bank N.Y. (Chicago), ABN AMRO BANK TOKYO BRANCH, AIG INTERNATIONAL, INC. and ALLIED IRISH BANKS PLC. For each prospective counterparty, two lines of data fields are provided. The first line provides active input fields for setting or designating credit limits. The trading party administrative user can select a field corresponding to a desired counterparty and time period, and set a desired credit limit by entering a suitable amount in the field, expressed in millions (for example, "100 M" or "30.5M"), or billions (for example, "20Y," not shown in FIG. 8) of, e.g., US dollars. It is also possible to enter an amount of "UNLIMITED" (not shown in FIG. 8.)

The system may also enforce maximum limits, e.g., 300M, either as a default or pursuant to trading party designation. Default values for credit limits may also be provided which may be overridden simply by entering a new number. Blank fields are defaulted to a zero value. A zero set as a result of a default, or a credit limit set from a previous value to zero, means that the counterparty has a zero credit limit. ABAX Bank, (Milan), AIG INTERNATIONAL, INC. and ALLIED IRISH BANKS PLC have zero credit set (or defaulted) in all tenors. As a result, Company A and these two firms can not trade with each other.

In some embodiments more potential counterparties will be available through the trading system than may be shown on a single screen. In such cases it is convenient to show several counterparties on one page of a screen, and others on other pages, pages being data sets for presentation on similar display screens, showing data related to different counterparties, etc., as is well known in the data processing arts. In the screen depicted in FIG. 8, an indication is given at the upper right of the screen that 29 pages of potential counterparties may be listed.

The second line of data in the screen of FIG. 8 for each potential counterparty shows the currently-available or remaining portion of the credit limits for trading with the counterparty. For example, where credit has previously been established and trading is proceeding, available credit portions are often below the set limit, and a lower number will be shown in the field on the second line in the screen depicted in FIG. 8 than in the corresponding location in the first line.

The "Counterparty Credit Limit Setup" screen depicted in FIG. 8 shows the following credit limits and available credit. For ABAX Bank, AIG International, Inc. and Allied Irish Bank PLC, all buckets have a zero credit limit, and, of course, credit remaining for all brackets is zero. For ABN AMRO Bank N.V. (Chicago), credit limits for buckets 1-6 and the Maximum bucket have been set to 100M, 30.5M, 30M, 100M, 100M, 100M, 300M, the respective credit remaining figures are 40M, 30M, 30M, 100M, 100M, 100M and 300M. For ABN AMRO Bank Tokyo Branch, the respective credit limit figures for the six buckets and the Maximum bucket are 100M, 50M, 10M, 10M, 70M, 100M and 300M, and the respective figures for credit remaining are 50M, 50M, 10M, 10M, 70M, 100M and 300M. (The values in the Maximum bucket are set, and are not the total of the values in the individual buckets.)

The system 20 stores the entered credit limits and the remaining credit or credit available amounts in memories 31 and 30 in matrices schematically diagrammed in FIGS. 2 and 3, respectively, as discussed above (The firm names and numbers in FIGS. 2-3 and FIG. 8 do not correspond.)

The system may set rules for credit limit entry, for example, as entered in the "User Term Settings" screen (not shown) through navigation from the "Edit My Term Settings" item in the menu screen depicted in 5, as discussed above. For example: minimum credit limit steps of, e.g., $0.1M; a maximum limit of, e.g., $999,999B; a maximum credit value attempted to be entered in any individual bucket greater than the value in the maximum bucket will not be accepted; a value attempted to be entered into the Maximum bucket during a trading session which is less than credit already used in during that trading session will not be accepted or will cause the value in all buckets in which credit remains to be set at zero.

Depending upon the embodiment, potential trades with a potential counterparty for which bilateral credit limits have not been set can not progress towards completion because such trades are not displayed due to credit filtering, or if displayed with color coding filtering, can not progress to completion without a credit check after a trading party hits or lifts a viewable bid or offer. For example, if "Company A" has set credit limits of "UNLIMITED" or other defined amounts, for trading of FX forwards in designated tenors with ABN AMRO Bank, N.V. (Chicago), but ABN AMRO Bank N.V. (Chicago) has set no, or zero, credit limits for such interests in corresponding tenors with Company A, trading between Company A and ABN AMRO Bank, N.V. (Chicago) will not be possible unless and until ABN AMRO Bank N.V. (Chicago) sets non-zero credit limits. Generally, in such embodiments, when both parties have set limits in corresponding tenors, trading is permitted to proceed towards completion if the minimum credit level mutually acceptable to both parties is less than the amount of the potential trade. In the matrices represented by FIGS. 2 and 3, customer numbers 2 and 3 can not trade in the tenor represented by the matrices because customer number 3 assigned customer number 2 a zero credit limit.

In some embodiments, it is not necessary for a trading party to set credit limits for all available tenors, or for more tenors than in which it wishes to trade. For example, a trading party may wish to trade in FX forwards only in selected tenors, so that credit limits are not set for all tenors available in the trading system. (The system defaults to a zero credit setting where a trading party does not set a credit limit.) A trading party interested in trading FX forwards can designate time periods corresponding to, for example, one-two weeks, two-three weeks, and five-seven weeks, but not three-five weeks. Preferably, in such cases, the trading system permits the trading party to trade with any counterparty who has established, with respect to the trading party, credit limits in overlapping but not necessarily congruent time periods. For example, a counterparty who set with the trading party of the above example a credit limit associated with a time period of four-six weeks would be permitted to trade with the trading party. It is also possible, in systems in which default time periods are offered, or in which a finite number of time periods may be set, for a trading party to elect not to set credit limits for all available time periods.

In some embodiments of the invention, an indication of the trading status between counterparties is indicated by displaying the credit limits in the screens of FIGS. 8 and 9 in different colors and/or displaying the anonymous orders of different, counterparty(ies) in different colors. For example, in a user interface screen such as that shown in FIG. 8, a counterparty for whom trading is enabled through the setting of mutual credit limits may be shown in a first color, such as white; with a counterparty who has not yet set credit limits for the trading party in a second color, such as red; with a counterparty to whom the trading party has not yet extended credit in a third color, such as green; and with respect to whom neither party has set credit limits in a fourth color, such as amber. The same color scheme may be used in the market display screen depicted in FIG. 4 in an embodiment with color coding.

Selection of the "View Counterparty Credits" item in FIG. 5 results in presentation of a user interface screen such as the "Available Credits/Credit Limits" screen shown in FIG. 9. In the screen depicted in FIG. 9, a two-row display is provided for each of the five counterparties associated with the 6 buckets and the Maximum bucket.

The amounts in each of the fields for each of the two-line displays correspond to those in the FIG. 8 screen. The available Credits/Credit Limits screen (FIG. 9) may be made accessible to all users within a trading party, whereas the Counterparty Credit Limit Setup screen (FIG. 8) may be made accessible to only administrative users of the trading party.

In addition, the top of the Available Credits/Credit Limits screen of FIG. 8 shows totals for all counterparts at the top of the screen. "Unlimited" limits appear in the "ON-ON" and "Maximum" buckets because unlimited credit has been extended to counterparties listed on pages other than page 1 of the 29-page screen.

In preferred embodiments of the invention, all credit data is stored in memory accessed, by the host computer 26 under the control of an operator of a system for electronic trading of financial interests, who maintains a complete credit book, or matrix, for all authorized trading parties, for use in controlling, tracking, and processing trades.

In some embodiments, once a trading party has set credit limits, it can trade by proceeding to a market display screen such as that shown in FIG. 4. The screen of FIG. 4 is used to trade United States dollars (USD) for Canadian dollars (CAD). The "Date" column 601 at the center of the screen and entries in the left half of the screen indicate that the trading party has set limits for, and is authorized to engage in, trading in overnight, spot next, 1-3 week, 1-6 month, 9 month, and 1 year tenors.

The screen depicted in FIG. 4 shows only orders that have been prescreened (or filtered) for available credit, so that only proposals upon which the viewing trading party can act are made known or accessible to the trading party. (The information in the market display screen depicted in FIG. 4 does not necessarily correspond to information shown in the screens depicted in the other figures.) For example, if a proposal to buy five million Canadian dollars at a stated spot rate would exceed the credit available between the counterparties (either for the particular tenor or for the aggregate limit), either none of the terms of the proposal are made available to or accessible by the trading party, or the quantity term shown is capped at the available credit limit, or at a designated increment of the credit limit (where, for example, minimum quantity or lot size restrictions are enforced), as discussed above. In a preferred embodiment, processing of terms for proposed trades and available portions of credit limits for such pre-screening is performed by host computer 26.

In different embodiments, available or remaining credit is used for pre-screening, color coding or credit checking prior to execution of a trade. These embodiments involve a comparison between financial exposure or size of the proposed trade, and the credit remaining amount for the concerned tenor and the concerned pair of potential counterparties. In the credit-filtered view embodiment, the result of the comparison is used to determine whether the particular order proposed by a potential counterparty can be displayed on trading party station display of another potential counterparty. In the color coding embodiment, the result of the comparison is used to determine the color in which to display the particular order proposed by a potential counterparty on the trading party station display of another potential counterparty. **In an embodiment in which a color-coded filtered view where orders are selectable regardless of credit, the result of the comparison is used to determine whether to allow an order of one potential counterparty that is hit or lifted by another potential counterparty to progress to completion or be blocked. In all cases, the result of the comparison is used to determine whether a proposed order or trade can be processed to progress towards completion.

In a preferred embodiment, where such prescreening is performed, the filtering process is performed on a dynamic basis, so that as trading between the trading party and counterparties by whom or to whom trades are proposed proceeds, and available credit limits are changed accordingly, the terms of displayed orders are updated in real time. It is preferred that in such embodiments that an order no longer displayed because of lack of credit be made available again to the trading party if available credit amounts are thereafter restored, as for example through replenishment or through cancellation of previously-executed trades, or, in one embodiment, by the execution of trades on opposite sides of the market.

A bid or offer on the screen depicted in FIG. 4 is hit or lifted by selecting the particular bid or offer. Upon execution of a trade, the amount of available credit between the trading party and the counterparty for the corresponding time periods (including any applicable aggregate limits) is changed accordingly, and, if necessary, terms of proposed trades on market displays are updated, as discussed above.

In a preferred embodiment of the invention, credit available (remaining) between a trading party and a potential counterparty is reset for each trading session equal to the credit limit set previously by the party (or to a new level set by the trading party prior to the beginning of or at the new session). As trades are executed between the trading party and the counterparties during the trading session, the credit available values are changed according to the sizes of the executed trades. Resetting may occur at the end of the trading session, or at the beginning of the next trading session, or at another suitable time. For example, upon closing of a trading session, or upon opening of a new session, host computer 26 accesses each trading party's previously-designated credit limits, and restores all credit limits and their associated remaining portions to full designated levels.

In preferred embodiments, trading parties can replenish available credit by resetting credit limits associated with particular counterparties and tenors, or groups thereof. For example, an administrative user of a trading party may access a screen such as the Counterparty Credit Limit Setup screen depicted in FIG. 8 at any point during a trading session, and by entering suitable data in any of the first-line fields increase (or decrease) the corresponding credit limit. In preferred embodiments, replenishment of available portions of credit limits may be made by a trading party at any time, either by replenishing credit limits associated with individual counterparties and time periods (including aggregate (Maximum) limits and other limits logically-associated with more than one time period), or by global resetting of all limits, either for selected or all counterparties. Preferably, such replenishment may be to previously-set credit limits, to fractions of previously-set limits, or to entirely new limits, at the option of the trading party. The changed counterparty credit limit information is stored in the credit limit databases (FIGS. 2 and 3). Trading party administrative users can change the limits in a manner such that the changed credit limits take effect immediately and/or indefinitely. Preferably, the modifications made to any credit limit time period are captured in From/To format. The number of credit limits and the credit limit by counterparty can be captured in a log file.

The end of a trading session, and/or the beginning of the next, is not restricted to the close and/or opening of a trading day. Any suitable point in a trading session for accounting or other purposes may be used. For example, in a trading system used 24 hours a day, a trading session may be deemed closed and reopened at any point or points during the day.

The set-up and revision of counterparty credit limit information may be made subject to, e.g., the following in a preferred embodiment. The information entered by a trading party administrative user is available and applicable on a firm-wide basis, including trading party non-administrative, trading users. If a firm is in a shared credit condition, the firm's credit limit definition is preferably established off the credit leader. When a firm is added or removed to or from the credit-sharing firm, the group's credit bucket setup should remain the same for time period date purposes. But, modifications to the credit limit definitions change the credit limits accordingly. For example, if a counterparty in Bucket 2 had a $500 million credit limit, and was modified from tenor dates >1M to 6M to >1M to 1Y, the $500 million credit limit for this counterparty would be reset to a $0 credit limit. Also, all affected counterparties are highlighted and a banner displayed on the top of the screen alerting the trading party administrative user to again enter credit amounts. When a firm's branch is removed from a credit-sharing condition, its credit bucket setup should remain the same for time period purposes, but the credit limits are reset to $0 for each of their counterparties. On all swap transactions, all near leg credit reductions will be drawn down from the overnight credit limits due to its immediate exposure until spot settlement.

If the user does not have the appropriate access authorizations, the trading system may determine whether or not the counterparty credit limits can be viewed by that user through an appropriate selection in the main menu screen or elsewhere in the Edit Firm Profile screen (not shown) of the screen depicted in FIG. 5. If permitted, the user can view the credit limits as well as other counterparty credit limit information for trading parties sharing credit on display screens.

If partial trading is enabled, a partial trade for an amount up to the credit limit, rather than the full trade, may be displayed. In such an embodiment, for example, the price, size, or quantity of the proposed trade is capped, if a price term associated with the proposed trade is greater than an available portion corresponding to a credit limit associated with the trader, the potential counterparty, and a time period associated with the proposed trade.

Those of ordinary skill in the applicable arts can provide programming to achieve the credit filtering functionality disclosed herein, as indicated by the patents identified above. For example, those of ordinary skill in the art can provide programming which consults, e.g., the credit matrices represented by FIGS. 2 and/or 3 when determining whether and how to display executable market information to trading parties.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention. For example, the invention has application to trading of financial interests that have a future exposure or risk other than FX.

What is claimed is:

1. A method of providing credit-filtered market data in a computerized system for trading over a network financial interests having a future financial exposure, the method comprising:

for each of a plurality of future time periods with respect to a trading session, providing a credit value in a memory device, the credit value being designated by a trading party for use in connection with trading financial interests between the trading party and at least one counterparty, the financial interests having a financial exposure to the trading party in the respective future time periods;

providing in the memory device, an aggregate credit value designated by the trading party for trading between the trading party and at least one counterparty, wherein the aggregate credit value is associated with financial exposure to the trading party in a plurality of the respective future time periods; and during the trading session, controlling display to the trading party of a proposed trade between the trading party and the at least one counterparty of a financial interest having a financial exposure in a future time period (i) according to whether the financial exposure to the trading party of the financial instrument in the future time period, expressed in terms compatible with the credit value in the memory device for the future time period, is less than the credit value in the memory device for the future time period, and (ii) in the event that the future time period is associated with the aggregate value, also or alternatively according to whether the total financial exposure to the trading party aggregated over each of the future time periods associated with the aggregate credit value is less than the aggregate credit value.

2. A method of providing credit-filtered market data in a computerized system for trading over a network financial interests having a future financial exposure, the method comprising:

for each of a plurality of future time periods with respect to a trading session, providing a credit value in a memory device at or prior to a start of the trading session, the credit value being designated by each of a pair of potential counterparties for use in connection with trading financial interests with each other, the financial interests having a financial exposure to each of the pair of counterparties in the respective future time periods;

providing in the memory device, a maximum credit value designated by each of the pair of potential counterparties for trading with each other, wherein the maximum credit value is associated with financial exposure to each of the pair of counterparties over all of the respective future time periods; and during the trading session, controlling display to at least one of the trading parties of a proposed trade between the pair of potential counterparties of a financial interest having a financial exposure to each of the potential counterparties in a future time period according to whether (i) the financial exposure to each of the potential counterparties of the financial instrument in the future time period, expressed in terms compatible with the credit value in the memory device for the future time period, is less than the lesser of the credit values provided in the memory device for each of the potential counterparties for the future time period and/or (ii) the financial exposure to each of the potential counterparties of the financial instrument aggregated over all of the future time periods is less than the lesser of the maximum credit values provided for each of the potential counterparties.

3. A method of providing credit-filtered market data in a computerized system for trading over a network financial interests having a future financial exposure, the method comprising:

for each of a plurality of future time periods, providing in a memory device a credit value designated by a trading party for use in connection with trading financial interests between the trading party and at least one counterparty, the financial interests having a financial exposure to the trading party in the respective future time periods;

during a trading session, controlling display to the trading party of a proposed trade between the trading party and the at least one counterparty of a financial interest having a financial exposure in a future time period according to whether the financial exposure to the trading party of the financial instrument in the future time period, expressed in terms compatible with the available credit value in the memory device for the future time period, is less than the available credit value in the memory device for the future time period; and on a time basis or trading session basis, automatically resetting available credit between the trading party and the at least one counterparty for each of the future time periods to the credit value designated by the trading party.

4. A method of providing credit-filtered market data in a computerized system for trading foreign exchange forwards contracts over a network, the method comprising:

for each of a plurality of future time periods with respect to a trading session, providing a credit value in a memory device, at or prior to a start of the trading session, the credit value being designated by a trading party for use in connection with trading foreign exchange forwards contracts between the trading party and at least one counterparty, the forwards contracts having a forwards leg in a future time period; during the trading session, controlling display to the trading party of a proposed trade between the trading party and the at least one counterparty of a foreign exchange forwards contract for a given currency pair having a forward leg in a future time period according to whether the financial exposure to the trading party for the future time period, accounting for the size of the proposed trade and expressed in a currency compatible with the credit value in the memory device for the future time period, is less than the credit value in the memory device for the future time period; and on a time basis or trading session basis, automatically resetting available credit between the trading party and the at least one counterparty for each of the future time periods to the credit value designated by the trading party.

5. A method of providing credit-filtered market data in a computerized system for trading over a network financial interests having a future financial exposure, the computerized system comprising a central computer linked by a network to a plurality of trading party stations associated with trading parties that are potential trading counterparties, the method comprising:

for each of a plurality of future time periods with respect to a trading session, providing a credit value in a memory device accessible by the central computer linked by the network to the plurality of trading party stations associated with potential trading counterparties, the credit value being designated by a trading party for use in connection with trading financial interests between the trading party and at least one counterparty, the financial interests having a financial exposure to the trading party in the respective future time periods; and during the trading session, the central computer controlling display at the trading party station of the trading party over the network of a proposed trade between the trading party and the at least one counterparty of a financial interest having a financial exposure in a future time period according to the central computer determining whether the financial exposure to the trading party of the financial instrument in the future time period, expressed in terms compatible with the credit value in the memory device for the future time period, is less than the credit value in the memory device for the future time period.

6. The method of claim 2, 3 or 4, wherein the computerized system comprises a central computer linked to a plurality of trading party computers by a network, and wherein controlling display of a proposed trade comprises the central computer controlling such display over the network at the trading party station of the trading party.

7. The method of claim 2 or 3, wherein the financial interest is foreign exchange forwards contracts, and wherein controlling display of a proposed trade comprises controlling display of a proposed trade between the trading party and the at least one counterparty of a foreign exchange forwards contract for a given currency pair having a forward leg in a future time period according to whether the financial exposure for the future time period, accounting for the size of the proposed trade and expressed in a currency compatible with the credit value in the memory device for the future time period, is less than the credit value in the memory device for the future time period.

8. The method of claim 1 wherein in the event that the financial exposure to the trading party of the financial instrument in the future time period, expressed in terms compatible with the available credit value in the memory device for the future time period, is more than the credit value in the memory device, then controlling display of the proposed trade between the trading party and the at least one counterparty comprises (i) changing the proposed trade so that the financial exposure in the future time period to the trading party, expressed in terms compatible with the available credit value in the memory device for the future time period, is not greater than the credit value in the memory device and (ii) displaying the changed trade.

9. A system providing credit-filtered market data in computerized trading over a network of financial interests having a future financial exposure, comprising:
   a computer system comprising a central computer linked to a plurality of trading party stations by a network;
   a memory device, accessible by the central computer, storing a credit value for each of a plurality of future time periods with respect to a trading session, at or prior to a start of the trading session, the credit value being designated by a trading party for use in connection with trading financial interests between the trading party and at least one counterparty, the financial interests having a financial exposure to the trading party in the respective future time periods;
   the central computer being programmed to control display to the trading party over the network, during the trading session, of a proposed trade between the trading party and the at least one counterparty of a financial interest having a financial exposure in a future time period according to whether the financial exposure to the trading party of the financial instrument in the future time period, expressed in terms compatible with the available credit value in the memory device for the future time period, is less than the credit value in the memory device.

10. A system providing credit-filtered market data in computerized trading over a network of financial interests having a future financial exposure, comprising:
    a computer system comprising a central computer linked to a plurality of trading party stations by a network;
    a memory device, accessible by the central computer, storing a credit value for each of a plurality of future time periods with respect to a trading session, at or prior to a start of the trading session, the credit value being designated by each of a pair of potential counterparties for use in connection with trading financial interests with each other, the financial interests having a financial exposure to each of the pair of counterparties in the respective future time periods; and
    the central computer being programmed to control display to the trading party over the network, during the trading session, of a proposed trade between the pair of potential counterparties of a financial interest having a financial exposure to each of the potential counterparties in a future time period according to whether the financial exposure to each of the potential counterparties of the financial instrument in the future time period, expressed in terms compatible with the credit value in the memory device for the future time period, is less than the lesser of the credit values provided in the memory device for each of the potential counterparties for the future time period.

11. A system providing credit-filtered market data in computerized trading over a network of financial interests having a future financial exposure, comprising:
    a computer system comprising a central computer linked to a plurality of trading party stations by a network;
    a memory device, accessible by the central computer, storing a credit value for each of a plurality of future time periods with respect to a trading session, at or prior to a start of the trading session, the credit value being designated by a trading party for use in connection with trading financial interests between the trading party and at least one counterparty, the financial interests having a financial exposure to the trading party in the respective future time periods and storing the credit value for each time period and each counterparty as a remaining credit value for use during the trading session;
    the central computer being programmed to control display to the trading party over the network, during the trading session, of a proposed trade between the trading party and the at least one counterparty of a financial interest having a financial exposure in a future time period according to whether the financial exposure to the trading party of the financial instrument in the future time period, expressed in terms compatible with the remaining credit value in the memory device for the future time period, is less than the remaining credit value in the memory device.

12. A system providing credit-filtered market data in computerized trading over a network of foreign exchange-forwards contracts having a future financial exposure, comprising:
    a computer system comprising a central computer linked to a plurality of trading party stations by a network;
    a memory device, accessible by the central computer, storing a credit value for each of a plurality of future time periods with respect to a trading session, at or prior to a start of the trading session, the credit value being designated by a trading party for use in connection with trading foreign exchange forwards contracts between the trading party and at least one counterparty, the foreign exchange forwards contracts having a forwards leg in a future time period; and
    the central computer being programmed to control display to the trading party over the network, during the trading session, a proposed trade between the trading party and the at least one counterparty of a foreign exchange forwards contract for a given currency pair having a forward leg in a future time period according to whether the financial exposure for the future time period, accounting for the size of the proposed trade and expressed in a currency compatible with the credit value in the memory device for the future time period, is less than the credit value in the memory device for the future time period.

13. The system of claim 10 or 11, wherein the financial interest is foreign exchange forwards contracts, and wherein the central computer is programmed to control the display of a proposed trade between the trading party and the at least one counterparty of a foreign exchange forwards contract for a given currency pair having a forward leg in a future time period according to whether the financial exposure for the future time period, accounting for the size of the proposed trade and expressed in a currency compatible with the credit value in the memory device for the future time period, is less than the credit value in the memory device for the future time period.

14. system of claim 9, wherein the central computer is programmed such that in the event that the financial exposure to the trading party of the financial instrument in the future time period, expressed in terms compatible with the available credit value in the memory device for the future time period, is more than the credit value in the memory device, then the central computer is operable (i) to change the proposed trade so that the financial exposure in the future time period to the trading party, expressed in terms-compatible with the available credit value in the memory device for the future time period, is not greater than the credit value in the memory device and (ii) to display at the trading party station of the trading party the changed trade.

15. A method of providing credit-filtered market data in a computerized system for trading financial interests over a network, the method comprising:
providing in a memory device, an aggregate credit value designated by a trading party for use in connection with trading financial interests between the trading party and at least one counterparty, the financial interests having a financial exposure to the trading party in one or more of present and future time periods, wherein the aggregate credit value is associated with a designated plurality of the present and future time periods; and
during a trading session, controlling display to the trading party of a proposed trade between the trading party and the at least one counterparty of a financial interest having a financial exposure in one or more of the time periods associated with the aggregate credit value according to whether the financial exposure to the trading party, aggregated over the time periods associated with the aggregate credit value, and expressed in terms compatible with the credit value in the memory device for the one or more of the time periods, is less than the aggregate credit value in the memory device; and
on a time basis or trading session basis, automatically resetting available credit between the trading party and the at least one counterparty aggregated over the time periods associated with the aggregate credit value to the aggregate credit value designated by the trading party.

16. A system comprising a computer usable medium or media storing computer readable code which when executed causes at least one computer to carry out a method of providing credit-filtered market data in a computerized system for trading over a network financial interests having a future financial exposure, the method comprising:
for each of a plurality of future time periods with respect to a trading session, providing a credit value in a memory device, the credit value being designated by a trading party for use in connection with trading financial interests between the trading party and at least one counterparty, the financial interests having a financial exposure to the trading party in the respective future time periods;
providing in the memory device, an aggregate credit value designated by the trading party for trading between the trading party and at least one counterparty, wherein the aggregate credit value is associated with financial exposure to the trading party in a plurality of the respective future time periods; and
during the trading session, controlling display to the trading party of a proposed trade between the trading party and the at least one counterparty of a financial interest having a financial exposure in a future time period (i) according to whether the financial exposure to the trading party of the financial instrument in the future time period, expressed in terms compatible with the credit value in the memory device for the future time period, is less than the credit value in the memory device for the future time period, and (ii) in the event that the future time period is associated with the aggregate value, also or alternatively according to whether the total financial exposure to the trading party aggregated over each of the future time periods associated with the aggregate credit value is less than the aggregate credit value.

17. A system comprising a computer usable medium or media storing computer readable code which when executed causes at least one computer to carry out a method of providing credit-filtered market data in a computerized system for trading over a network financial interests having a future financial exposure, the method comprising:
for each of a plurality of future time periods with respect to a trading session, providing a credit value in a memory device at or prior to a start of the trading session, the credit value being designated by each of a pair of potential counterparties for use in connection with trading financial interests with each other, the financial interests having a financial exposure to each of the pair of counterparties in the respective future time periods;
providing in the memory device, a maximum credit value designated by each of the pair of potential counterparties for trading with each other, wherein the maximum credit value is associated with financial exposure to each of the pair of counterparties over all of the respective future time periods; and
during the trading session, controlling display to at least one of the trading parties of a proposed trade between the pair of potential counterparties of a financial interest having a financial exposure to each of the potential counterparties in a future time period according to whether (i) the financial exposure to each of the potential counterparties of the financial instrument in the future time period, expressed in terms compatible with the credit value in the memory device for the future time period, is less than the lesser of the credit values provided in the memory device for each of the potential counterparties for the future time period and/or (ii) the financial exposure to each of the potential counterparties of the financial instrument aggregated over all of the future time periods is less than the lesser of the maximum credit values provided for each of the potential counterparties.

18. A system comprising a computer usable medium or media storing computer readable code which when executed causes at least one computer to carry out a method of providing credit-filtered market data in a computerized system for trading over a network financial interests having a future financial exposure, the method comprising:
for each of a plurality of future time periods, providing in a memory device a credit value designated by a trading party for use in connection with trading financial interests between the trading party and at least one counterparty, the financial interests having a financial exposure to the trading party in the respective future time periods;
during a trading session, controlling display to the trading party of a proposed trade between the trading party and the at least one counterparty of a financial interest having a financial exposure in a future time period according to whether the financial exposure to the trading party of the financial instrument in the future time period, expressed in terms compatible with the available credit value in the memory device for the future time period, is less than the available credit value in the memory device for the future time period; and on a time basis or trading session basis, automatically resetting available credit between the trading party and the at least one counterparty for each of the future time periods to the credit value designated by the trading party.

19. A system comprising a computer usable medium or media storing computer readable code which when executed causes at least one computer to carry out a method of providing credit-filtered market data in a computerized system for trading foreign exchange forwards contracts over a network, the method comprising:

for each of a plurality of future time periods with respect to a trading session, providing a credit value in a memory device, at or prior to a start of the trading session, the credit value being designated by a trading party for use in connection with trading foreign exchange forwards contracts between the trading party and at least one counterparty, the forwards contracts having a forwards leg in a future time period;

during the trading session, controlling display to the trading party of a proposed trade between the trading party and the at least one counterparty of a foreign exchange forwards contract for a given currency pair having a forward leg in a future time period according to whether the financial exposure to the trading party for the future time period, accounting for the size of the proposed trade and expressed in a currency compatible with the credit value in the memory device for the future time period, is less than the credit value in the memory device for the future time period; and on a time basis or trading session basis, automatically resetting available credit between the trading party and the at least one counterparty for each of the future time periods to the credit value designated by the trading party.

20. A system comprising a computer usable medium or media storing computer readable code which when executed causes at least one computer to carry out a method of providing credit-filtered market data in a computerized system for trading over a network financial interests having a future financial exposure, the computerized system comprising a central computer linked by a network to a plurality of trading party stations, the method comprising:

for each of a plurality of future time periods with respect to a trading session, providing a credit value in a memory device accessible by the central computer linked by the network to the plurality of trading party stations associated with potential trading counterparties, the credit value being designated by a trading party for use in connection with trading financial interests between the trading party and at least one counterparty, the financial interests having a financial exposure to the trading party in the respective future time periods; and during the trading session, the central computer controlling display at the trading party station of the trading party over the network of a proposed trade between the trading party and the at least one counterparty of a financial interest having a financial exposure in a future time period according to the central computer determining whether the financial exposure to the trading party of the financial instrument in the future time period, expressed in terms compatible with the credit value in the memory device for the future time period, is less than the credit value in the memory device for the future time period.

21. The method according to claim 1, wherein controlling display to the trading party of the proposed trade comprises displaying the proposed trade to the trading party according to color-coding by displaying the proposed order in different colors to indicate whether sufficient or insufficient credit exists.

22. The method according to claim 1, wherein controlling display to the trading party of the proposed trade comprises preventing display of the proposed trade if the total financial exposure is greater than the aggregate credit value.

23. The method according to claim 1, wherein controlling display of the proposed trade comprises filtering proposed trades to prevent display if the financial exposure is greater than the credit value in the memory device for the future time period.

24. The method according to claim 1, wherein the aggregate credit value is associated with all of the respective future time periods.

25. The method according to claim 1, further comprising, on a time basis or trading session basis, automatically resetting available credit between the trading party and the at least one counterparty for each of the future time periods to the credit value designated by the trading party.

26. The method according to claim 3, wherein the time basis or trading session basis is selectable by the trading party.

* * * * *